United States Patent

Wu

Patent Number: 6,155,794
Date of Patent: Dec. 5, 2000

[54] ASPIRATING AERATOR

[75] Inventor: Shihai Wu, Guangxi, China

[73] Assignee: Fangchenggang Ocean Science and Technology Development Center, Guangxi, China

[21] Appl. No.: 09/150,111

[22] Filed: Sep. 9, 1998

[51] Int. Cl.[7] .................................. F04F 5/44; F04F 5/00
[52] U.S. Cl. ....................... 417/151; 417/198; 239/428.5; 261/121.1
[58] Field of Search ...................... 417/151, 198; 119/263; 239/428.5; 4/492; 261/121.1; 366/262

[56] References Cited

U.S. PATENT DOCUMENTS

| | | | |
|---|---|---|---|
| 1,751,719 | 3/1930 | Uhri | 239/8 |
| 2,382,391 | 8/1945 | Berman | 417/198 |
| 3,625,820 | 12/1971 | Gluntz et al. | 376/372 |
| 4,792,284 | 12/1988 | Straub et al. | 417/77 |
| 5,478,208 | 12/1995 | Kasai et al. | 417/53 |
| 5,611,673 | 3/1997 | Agata | 417/198 |

FOREIGN PATENT DOCUMENTS

87214816 U  10/1988  China.

*Primary Examiner*—Henry C. Yuen
*Assistant Examiner*—Arnold Castro
*Attorney, Agent, or Firm*—Darby & Darby

[57] ABSTRACT

This invention relates to aquaculture machinery, particularly an aspirating aerator which is intended to enrich dissolved oxygen in the water body of high density aquaculture. The aerator comprises an aspirating device, a submersible pump and a support, wherein said aspirating device further comprises a tube, a conical nozzle, an air-water mixing chamber, an inlet pipe, a spherical cavity and a convergent tube. A 750 W aspirating aerator can aspire more than 24 $m^3$ of air per hour into the breeding water body. The aerator of this invention is featured in its simple structure, low power consumption, high efficiency and capacity of oxygen enrichment, safety for the fish, low manufacture cost and practical operation.

2 Claims, 1 Drawing Sheet

ASPIRATING AERATOR

BACKGROUND OF THE INVENTION

The present invention relates to aquaculture machinery, particularly an aspirating aerator which is intended to enrich dissolved oxygen in the water body of high density aquaculture.

The aerators now commonly used in high density aquaculture are mainly the vane wheel type and waterwheel type. These two types of aerator can only be used in the upper level of water body in the breeding pond, so the air brought in by the vane wheel does not contact directly with the unsaturated oxygen water at the middle and lower levels, thus the oxygen enrichment is slow and the power consumption is relative high.

Although the aerators disclosed in the published Chinese patent applications CN87214816 and No. 90211507.3 overcome the drawbacks of the vane wheel type and waterwheel type aerators, the air introduced to the water body of the middle and lower levels is not much, a 750 W aspirating aerator only sucks in 12 $m^3$ of air per hour (see CN87214816).

SUMMARY OF THE INVENTION

The object of the present invention is to provide a new aspirating aerator which can aspirate much more air directly into the water body of the middle and lower levels with fast and efficient oxygen enrichment and low power consumption.

BRIEF DESCRIPTION OF THE DRAWINGS

The characteristics and advantages of the present invention will be understood more clearly through the following description in connection with the accompanying drawings, in which.

DESCRIPTION OF AN ILLUSTRATIVE EMBODIMENT

Figure 1:
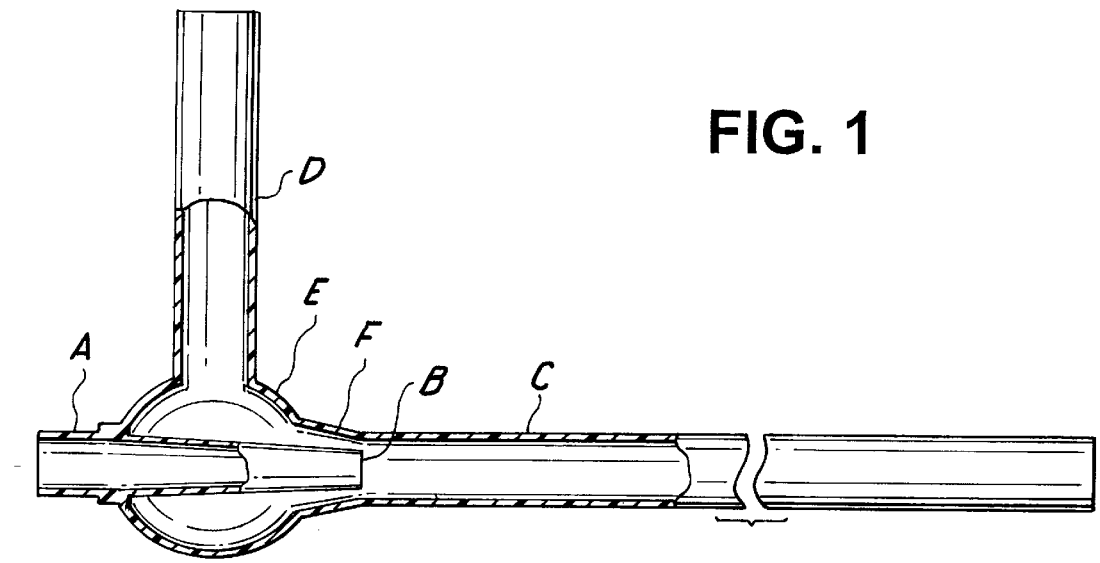
FIG. 1 is a schematic view of an aspirating device.

As shown in FIG. 1, a new type of aspirating device S is realized according to the principle of negative pressure suction of liquid jetflow. The aspirating device comprises a submergible pump P (FIG. 2) a tube A, a conical nozzle B, an air-water mixing chamber C, an inlet pipe D, a spherical cavity E and a convergent tube F. The aspirating device S is connected to the submersible pump P, and is fixed at the middle and lower levels of water body by a support G.

Figure 2:
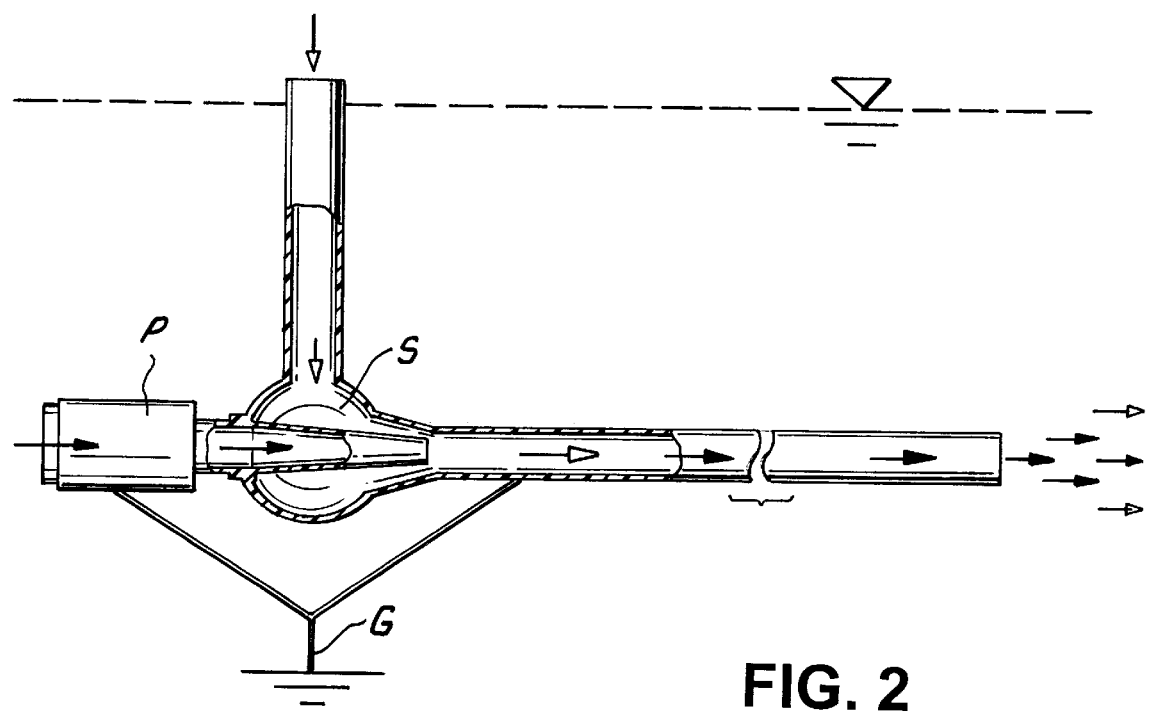
FIG. 2 is a functional view of an aspirating aerator.

The function of the aerator of this invention is shown in FIG. 2. As the aerator is powered-on, the submersible pump P sucks in the unsaturated oxygen water (shown as hollow arrows) of the middle and lower levels of the water body in the breeding pond, the sucked water flows at high speed, via tube A and nozzle B, into the air-water mixing chamber C, producing negative pressure, causing the air (shown as solid arrows) to be aspired into the air-water mixing chamber through inlet pipe D, spherical cavity E and convergent tube F. The oxygen in air mixes thoroughly with high speed water flow in the air-water mixing chamber and is dissolved in the water rapidly, turning the unsaturated oxygen water sucked by the submersible pump into saturated oxygen water. Then the saturated oxygen water is injected into the water body of the middle and lower levels, enriching quickly the dissolved oxygen in the breeding pond.

The aerator according to this invention has the following advantages:

(a) Low energy consumption and high enriching capacity. A 750 W aspirating aerator can aspire more than 24 $m^3$ of air per hour into the breeding water, which is two times the capacity of the prior art.

(b) High efficiency of oxygen enrichment. Since the aerator according to the invention is fixed directly at the middle and lower levels of the water body, the mixture of the air and the unsaturatedoxygen water is injected directly into the water body of the middle and lower levels with a flow distance of more than 20 m, so the oxygen is dissolved rapidly in unsaturated oxygen water.

(c) During operation, the aerator of this invention does not have any exposed moving parts, so it will not hurt the fishes and shrimps in water.

(d) Simple structure, convenient and practical with low manufacture cost. The present aerator consists of a submersible pump, aspirating device and support. The aspirating device can be made of metal and plastic with simple structure, reduced dimension, light weight and low cost, and it is easy to fix and operate.

What is claimed:

1. An aspirating aerator for aquaculture in a body of water comprising an aspirating device, a submersible pump and a support, said aspirating device comprises a tube (A), a conical nozzle (B), a cylindrical air-water mixing chamber (C), an inlet pipe (D), a spherical cavity (E) and a convergent tube (F); said tube (A) having a left end connected to a water outlet of the submersible pump and a right end connected to the left end of conical nozzle (B); the right end of said conical nozzle (B) projecting into the convergent tube (F) up to the right end of convergent tube (F) and the left end of cylindrical air-water mixing chamber (C); said spherical cavity (E) having a left edge connected to the left end of conical nozzle (B) and right end of tube (A), a right edge connected to the left end of convergent tube (F), and an upper edge connected to the lower end of inlet pipe (D); the right end of said convergent tube (F) being connected to the left end of said air-water mixing chamber (C).

2. The aspirating aerator according to claim 1, wherein it is fixed at middle and lower levels of the body of water and said inlet pipe extends above the surface of the body of water.

* * * * *